2,813,779
Patented Nov. 19, 1957

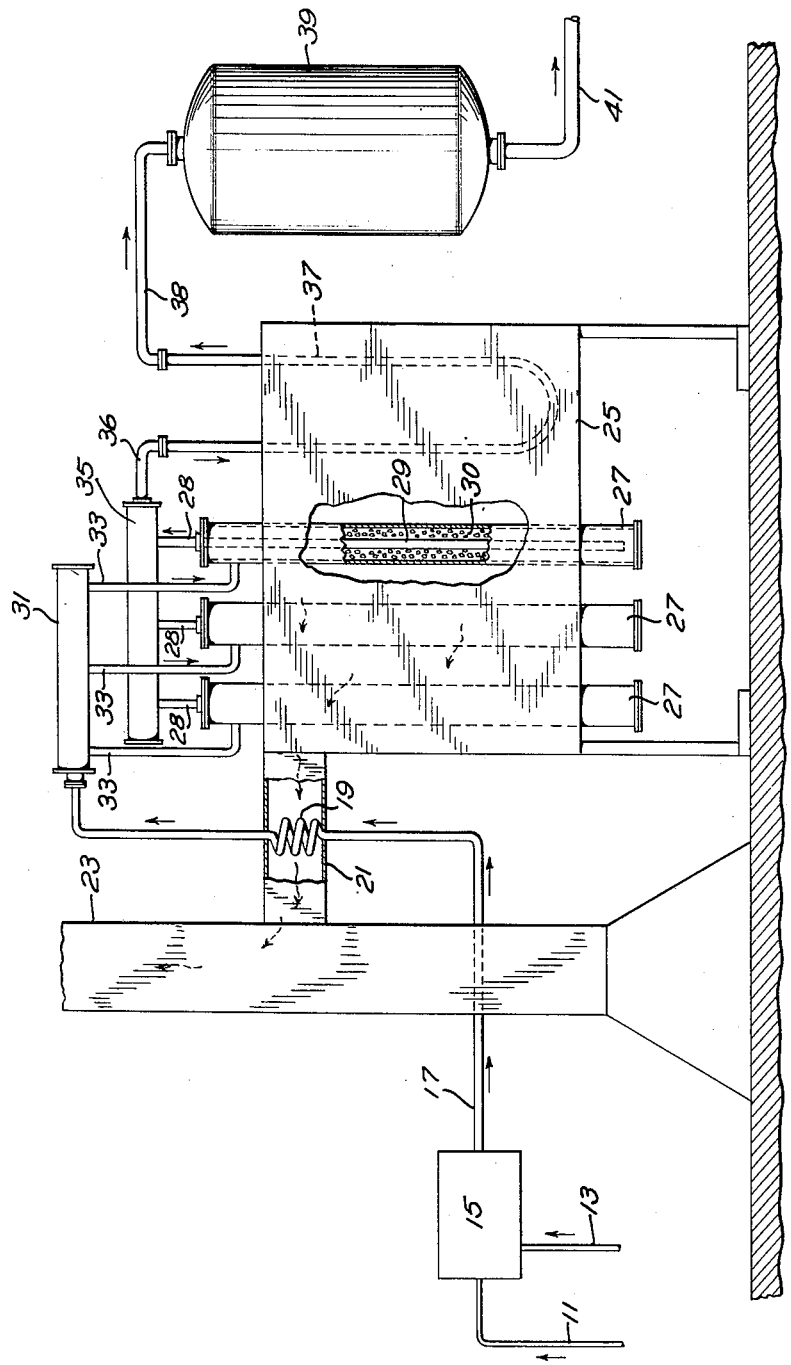

United States Patent Office

2,813,779

PROCESS FOR PRODUCING GASES CONTAINING HYDROGEN FROM HYDROCARBONS

Albert C. Faatz, Jr., Montclair, N. J., assignor to Foster Wheeler Corporation, New York, N. Y., a corporation of New York Application September 28, 1954, Serial No. 458,748

2 Claims. (Cl. 23—212)

This invention relates to process and apparatus for catalytic reactions and more particularly to improved process and apparatus for the production of gases containing hydrogen from hydrocarbons.

In the production of hydrogen from hydrocarbons, fluid hydrocarbon, either in liquid or gaseous state, is mixed with an oxidizing fluid as for example steam, carbon dioxide, air or other oxidizing fluids or mixtures thereof, and the mixture is passed through the suitable catalyst at an elevated temperature so that the reaction of the hydrocarbon with the oxidizing fluid may proceed. Since the reacting fluids, if no external heat is supplied, absorb heat, means are provided for adding the endothermic heat of reaction to the reacting mixture; otherwise the temperature of the fluid mixtures falls and the reaction slows down and eventually stops. Generally, the fluid hydrocarbon and oxidizing fluid are passed through tubes which contain suitable catalyst and are arranged in a furnace. The heat of combustion of the furnace fuel is transmitted through the tube walls into the reacting mixture as the latter passes through the catalyst mass and thereby provides the endothermic heat of reaction. In the process set forth, it is desirable to employ high temperatures in order that the reaction rate be high, and also because the equilibrium of the reactions for the production of hydrogen are favored by higher temperatures. For this reason, the tubes are constructed of expensive alloy steels or other metals having high strength and resistance to creep at high temperatures to prevent the tubes from failing.

The mixture of hydrocarbon fluid and oxidizing fluid usually enters the top of the catalyst tube and flows down through the catalyst leaving the latter at the bottom of the tube. During its passage through the catalyst, the hydrocarbons and the oxidizing fluid, as for example, steam, will react if heated to suitable temperature levels, and maintained at these temperatures. Although the reaction between the hydrocarbons and the oxidizing fluid could proceed at much lower temperatures than conventionally employed, the rate of reaction would be too small to be commercially feasible. Since the reaction is endothermic, heat must be continually supplied to the reactants to maintain the temperature level required to keep the reaction rate at the desired value.

The present invention has for one of its objects an improved process and apparatus for producing, by catalytic reaction of fluid hydrocarbons with an oxidizing fluid, a hydrogen-rich product gas with a low content of unreacted hydrocarbons, and in which the amount of tube material, and total catalyst charge, are reduced below that employed in conventional arrangements, and further in which furnace temperatures may be reduced below those which are attained in conventional furnaces. The invention also contemplates greater ease in reducing the unreacted hydrocarbons to low concentrations in the hydrogen-containing product gas than is possible with conventional equipment.

The present invention contemplates improved process and apparatus for producing a high purity of hydrogen by the catalytic reaction of fluid hydrocarbons with an oxidizing fluid. In accordance with the invention, a mixture of fluid hydrocarbon and oxidizing fluid is passed through heated catalyst where the reaction takes place, and the products of the reaction are then reheated and passed to a reactor containing additional catalyst where the mixture is further reacted to effect a high purity of hydrogen.

In conventional furnaces, the number of catalyst tubes employed, the diameter and length of the tubes, and the catalyst charged to each tube are determined by such factors as the maximum temperature to which it is considered practical to heat the tube material, the pressure available for forcing the reacting mixture through the catalyst, and the desired or allowable content of unreactant hydrocarbons in the product gases. When the content of unreacted hydrocarbons must be reduced to a very low concentration, for example, 0.1 mol percent of the product gas, substantially more tubes and more catalyst are employed, and substantially higher temperatures are maintained within the furnace, than when the concentration of unreacted hydrocarbons need not be reduced to below 1% or 2%.

The tendency of the mixture to react is strongest at the entrance end of the tube, where the concentration of the hydrocarbons and the oxidizing fluid are the highest, and, therefore, the amount of heat which must be applied to the reactants to maintain temperature is greatest at this point. As the reaction proceeds, the amount of unreacted material naturally decreases and, if the temperature is maintained at a uniform level, the rate of reaction will decrease causing a corresponding decrease in the rate of heat absorption through the tube walls. Near the outlet end of the tube, where the reaction is substantially complete, very little heat is required to maintain the temperature level and, in fact, the temperature is generally allowed to rise somewhat within the limits prescribed by the alloy tube material in order to take advantage of the more favorable chemical reaction equilibrium at the higher temperatures.

In typical apparatus for producing hydrogen containing a low concentration of the residual hydrocarbon, a correlation may be made of the position of the reacting mixture in the catalyst tubes as a function of the concentrations of unreacted hydrocarbons and of the heat input of the reacting mixture as it progresses through the catalyst. In such relationship the heat input, or heat absorbed, is rapid at the inlet end of the catalyst tube but at the outlet end it is substantially slower. Similarly, the hydrocarbon content decreases rapidly at the inlet end of the catalyst tube, but at the outlet end the change is much less rapid. It is found that the most useful portion of the furnace, so far as providing a system for heat transfer is concerned, is the upper half where approximately 95 to 99% of the total heat requirement is transferred through the tube walls into the reacting mixture. The bottom half of the furnace does not provide much heat transfer nor are pronounced changes in the content of reacted hydrocarbon taking place. At the same time, the bottom half of the tube is just as costly as the upper half, being constructed of the same tube alloy and being filled with catalyst the same as (or similar to) that in the upper portion of the tube.

The invention will be apparent from the following description when considered in connection with the accompanying drawing wherein the single figure schematically illustrates an embodiment of the present invention.

Referring now to the drawing for a more detailed description of the present invention, the numeral 11 designates a conduit connected to a source (not shown) of oxidizing fluid, as for example, steam, carbon dioxide, oxygen or other oxidizing fluid, and a conduit 13 connected to a source (not shown) of fluid hydrocarbon, as for example, methane or propane; both of the fluids being under a pressure above atmospheric. The other ends of conduits 11 and 13 are connected to a mixing device 15 of conventional structure. As is well understood by those skilled in the art, the fluids flowing into mixing device 15 are intimately mixed therein, and an outlet conduit 17 is connected to the mixing device to conduct the mixture from the latter. A preheater 19, as for example, a coil, is located in a gas flue 21 which communicates with a stack 23 and a furnace 25, and is connected to conduit 17 to preheat the fluid mixture to raise the temperature of the latter to a point near the subsequent reaction temperature, thereby reducing the heat duty inside the furnace. Furnace 25 may be any one of the many conventional furnaces employed in catalytic reactions and wherein the furnace is fired by a fuel such as gas or oil.

A plurality of tubes 27 (only three showing in the drawing) are disposed in furnace 25 in heat exchange relationship with the gases of combustion. The opposite ends of each tube 27 are arranged outside the furnace 25 with the lower ends sealed and the upper ends having openings which accommodate short tubes 28. An inner tube 29 is disposed concentric with and in each of the tubes 27 to form annular spaces between the tubes. The upper ends of inner tubes 29 are secured to the corresponding upper ends of outer tubes 27 and are in communication with short tubes 28 while the lower ends of the inner tubes are spaced from the lower ends of outer tubes 29 whereby the tubes 27 and 29 are sealed with respect to each other except at the lower ends. A suitable catalyst 30 is provided in the annular spaces and forms a porous mass filling the spaces between the inner and outer tubes.

An inlet manifold 31 is connected to preheater 19 and has depending therefrom conduits 33 which communicate at their other ends with the annular spaces provided in tubes 27. The preheated fluid mixture from preheater 19 flows into manifold 31 thence through depending conduits 33, in parallel flow, and finally into the annular spaces which contain the catalyst 30. The fluid mixture passes downwardly through the catalyst mass to the lower ends of tubes 27 thence upwardly into inner tubes 29 and out of the latter through short tubes 28 where the fluids are collected in an outlet manifold 35. The heat resulting from the combustion within furnace 25 is transmitted through the walls of tubes 27 to maintain the temperature of the reactants at the desired level and to provide the endothermic heat of reaction.

As mentioned hereinbefore, in conventional equipment when the content of unreacted hydrocarbons is reduced to a very low concentration, as for example, 0.1 mol. percent of the product gases, substantially more tubes and more catalyst are employed, and substantially higher temperatures are maintained within the furnace than when the concentration of unreacted hydrocarbons need not be reduced to below 1 or 2%. The present invention contemplates reduction of unreacted hydrocarbons to a very low concentration that is, less than 0.3%, without increasing the number of tubes and temperature in the furnace, and the amount of catalyst employed. To this end, the combination of the number and size tubes 27, the quantity of catalyst 30 placed therein, and the temperature within the furnace 25, are such that the product gases leaving the catalyst 30 contain approximately 1 to 5 mol. percent unreacted hydrocarbons based on analysis of the dry product gases, and the temperature of the product gases are at a temperature in the approximate range of 1100–1500° F. The product gases contain hydrocarbons, carbon monoxide, carbon dioxide, and unreacted hydrocarbons, and are conducted from manifold 35 by a pipe 36 to a substantially U-shaped reheat tube 37 wherein the gases are heated to a substantially higher temperature in the approximate range of 1400–2000° F. Reheat tube 37 is shown located inside furnace 25, but it is to be understood that it can be placed within any source of high temperature heat, such as the furnace flue 21 or another furnace enclosure apart from furnace 25. The gases leave reheat tube 37 at a temperature in the approximate range of 1400–2000° F. and are conducted into a reforming reactor 39 by a conduit 38. Reactor 39 is an essentially adiabatic vessel of relatively inexpensive metal containing catalyst similar to, or the same as, that in the tubes 27, in that this catalyst promotes the reaction of hydrocarbons with an oxidizing fluid. In passing through this catalyst, the greater portion of the unreacted hydrocarbons reacts with oxidizing fluid not consumed by reaction in tubes 27, so that the gases leaving reactor 39 by way of a discharge conduit 41 contain substantially less unreacted hydrocarbons than the gases entering the reactor; the required endothermic heat for the reaction in reactor 39 being supplied by the sensible heat of the reactants. The unreacted hydrocarbons and the reactant gases passing through reactor 39 are reduced below 0.3% based on the dry gas analysis.

The reaction between the hydrocarbons and the oxidizing fluid being endothermic, the temperature of the gases leaving reactor 39 will be lower than the temperature of the gases entering, the drop in temperature being determined by the amount of reaction taking place within reactor 39 as well as by heat loss from reactor 39. Because the average temperature of the gas in reactor 39 is higher than in the tubes 27, conditions are more favorable for the reduction of the unreacted hydrocarbon content to a low value, the chemical equilibrium and the rate of reaction being favored by higher temperatures. It is found that it is possible to add the endothermic heat required for the chemical reaction which takes place in reactor 39 more advantageously in reheat tubes 37, where higher rates of heat transfer and lower tube metal temperatures can be achieved, than in catalyst containing tubes such as tubes 27. This is true so long as the amount of heat which must be added for the subsequent adiabatic reaction is not excessive, which in turn depends on the amount of unreacted hydrocarbons in the gases passing through the reheat tubes 37.

In operation, the fluid hydrocarbon and oxidizing fluid are intimately mixed in mixing tubes 15 and the mixture is conducted from the latter by conduit 17. The fluid mixture then passes through preheater 19 where the mixture is preheated and thence in parallel flow relationship into the catalyst containing tubes 27. The fluid mixture in passing the catalyst in tubes 27 is heated in an approximate range of from 1100–1500° F. and flows out of the tubes 27 through inner tubes 29. The fluid mixture in flowing through the catalyst is reacted to form a reformed gas containing a high percentage purity of hydrogen with approximately 1 to 5 mol. percent unreacted hydrocarbons. Reheat tube 37 heats the reformed gases to a temperature which is sufficient to provide the necessary sensible heat for the reaction in reactor 39 to thereby provide a reformed gas in discharge conduit 41 containing an unreacted hydrocarbon content of less than 0.3 mol. percent.

It will now be apparent that the present invention provides novel process and apparatus for producing high purity of hydrogen wherein the amount of tube material, total catalyst charge, and furnace temperatures may be reduced considerably compared with that necessary in other apparatus. By employing the reheat tube 37 and reforming reactor 39, the amount of expensive tube material representing the lower half of furnace catalyst tubes in the conventional apparatus is eliminated in the present invention; it being understood that tube 37 and reactor 39 provide the heat and catalyst, respectively, required for the process and which was added to the lower half of the catalyst tubes of the conventional apparatus.

Inasmuch as changes may be made in the form, location and relative arrangement of the several parts of the invention without departing from the process thereof it will be understood that the invention is not limited excepting by the scope of the appended claims.

What is claimed is:

1. A process for producing gases containing hydrogen from hydrocarbons, comprising the steps of mixing a fluid hydrocarbon together with an oxidizing fluid selected from the group consisting of steam and carbon dioxide and mixtures thereof, passing the mixture of hydrocarbon and oxidizing fluid through a catalyst heated to bring the temperature of the mixture within an approximate range of 1100–1500° F. to thereby cause reaction of said fluids and production of a gas containing a high percentage of hydrogen and a low percentage of unreacted hydrocarbon, passing the gas into a convection heating zone for heating the gas out of the presence of catalyst to a temperature within the approximate range of 1400 to 2000° F. and passing the gas from the convection heating zone adiabatically through additional catalyst at a higher temperature than that of the gas leaving the first-mentioned catalyst and in the approximate range of 1400–2000° F. to further reduce the unreacted hydrocarbon content thereof.

2. A process for producing gases containing hydrogen from hydrocarbons, comprising the steps of mixing a fluid hydrocarbon together with an oxidizing fluid selected from the group consisting of steam and carbon dioxide and mixtures thereof, passing the mixture of hydrocarbon and oxidizing fluid through a catalyst heated to bring the temperature of the mixture within an approximate range of 1100–1500° F. to thereby cause reaction of said fluids and production of a gas containing a high percentage of hydrogen and an unreacted hydrocarbon content in the range 1–5 mol. percent, passing the gas into a convection heating zone for heating the gas out of the presence of catalyst to a temperature in the approximate range 1400–2000° F., and passing the gas from the convection heating zone adiabatically through additional catalyst at a higher temperature than that of the gas leaving the first-mentioned catalyst and in the approximate range of 1400–2000° F. to further reduce the unreacted hydrocarbon content to less than 0.3 mol. percent.

References Cited in the file of this patent
UNITED STATES PATENTS

| | | |
|---|---|---|
| 1,874,801 | Porter | Aug. 30, 1932 |
| 1,901,136 | Wilcox | Mar. 14, 1933 |
| 1,904,441 | Freyermuth et al. | Apr. 18, 1933 |
| 1,904,592 | Young et al. | Apr. 18, 1933 |
| 2,537,708 | Scharmann | Jan. 9, 1951 |
| 2,625,470 | Roberts | Jan. 13, 1953 |